United States Patent [19]

Kumai

[11] Patent Number: 4,498,738
[45] Date of Patent: Feb. 12, 1985

[54] ELECTRIC MIRROR ANGLE ADJUSTING DEVICE WITH PIVOTING CROSS-SHAPED MEMBER

[75] Inventor: Toshiyuki Kumai, Fujieda, Japan

[73] Assignee: Murakami Kaimeido Co., Ltd., Shizuoka, Japan

[21] Appl. No.: 351,469

[22] Filed: Feb. 23, 1982

[30] Foreign Application Priority Data

Feb. 24, 1981 [JP] Japan .................. 56-024834

[51] Int. Cl.³ .................. G05G 7/00; G05G 1/00; G02B 8/05
[52] U.S. Cl. .................. 350/637; 74/471 XY; 248/900
[58] Field of Search .................. 350/289, 307; 74/471 XY, 501 M, 460–471, 490–501.5; 248/900

[56] References Cited

U.S. PATENT DOCUMENTS

| | | | |
|---|---|---|---|
| 3,286,545 | 11/1966 | Malachowski | 350/289 |
| 3,609,014 | 9/1971 | Kurz | 350/289 |
| 3,972,597 | 8/1976 | Repay et al. | 350/289 X |
| 4,056,253 | 11/1977 | Repay et al. | 350/289 X |
| 4,171,873 | 10/1979 | Repay et al. | 350/289 |
| 4,324,454 | 4/1982 | Kumai | 350/289 |
| 4,362,362 | 12/1982 | Usami et al. | 350/289 |

FOREIGN PATENT DOCUMENTS

| | | |
|---|---|---|
| 2456457 | 8/1976 | Fed. Rep. of Germany . |
| 2840789 | 3/1980 | Fed. Rep. of Germany . |
| 2032367 | 5/1979 | United Kingdom . |

Primary Examiner—John K. Corbin
Assistant Examiner—David Lewis

[57] ABSTRACT

An electric device for adjusting the angle of reflection of a mirror mounted on a motor vehicle. The mirror is pivotally connected to an actuator unit housing containing two actuators. Two adjusting nuts each having a movable pivot are respectively moved forward or backward by their actuators so as to adjust the angle of the mirror. The device of the invention is characterized by having a first guide means and/or a second guide means for controlling the direction of inclination, horizontal or vertical, of the mirror so as to prevent the mirror from being obliquely displaced during the operation of the motor vehicle. The first guide means comprises a cross-shaped member provided in front of the actuator unit housing and a cross-shaped groove, engaging therewith, provided on a mirror holder. Alternatively, the first guide means may comprise a cross pin, one of the two axes thereof being supported on the actuator unit housing, the other axis thereof being supported on the mirror holder. The second guide means comprises openings, longer in the horizontal or vertical direction, into which the adjusting nuts are respectively inserted.

5 Claims, 25 Drawing Figures

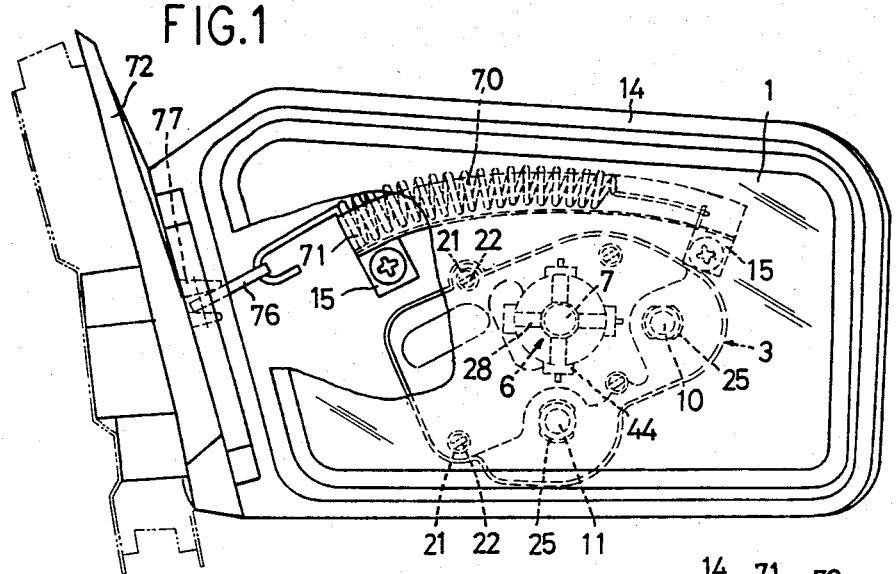
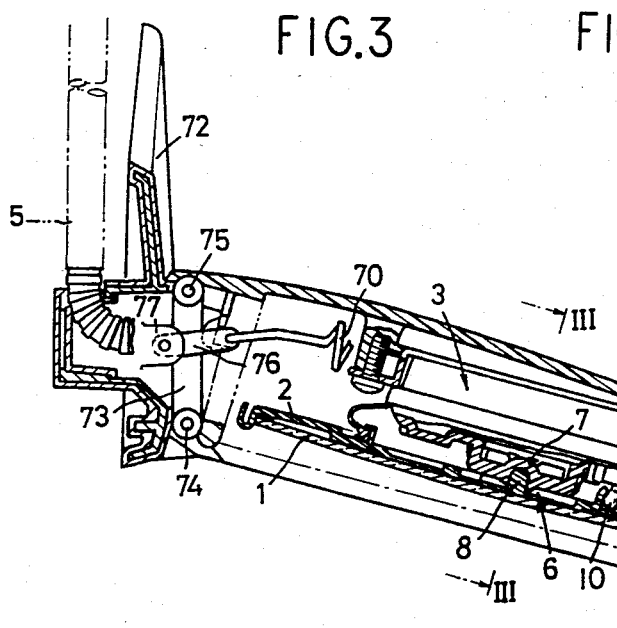
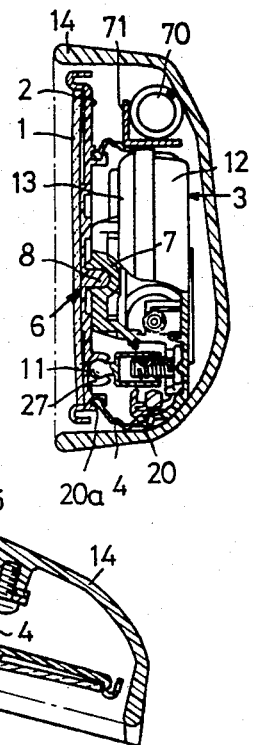

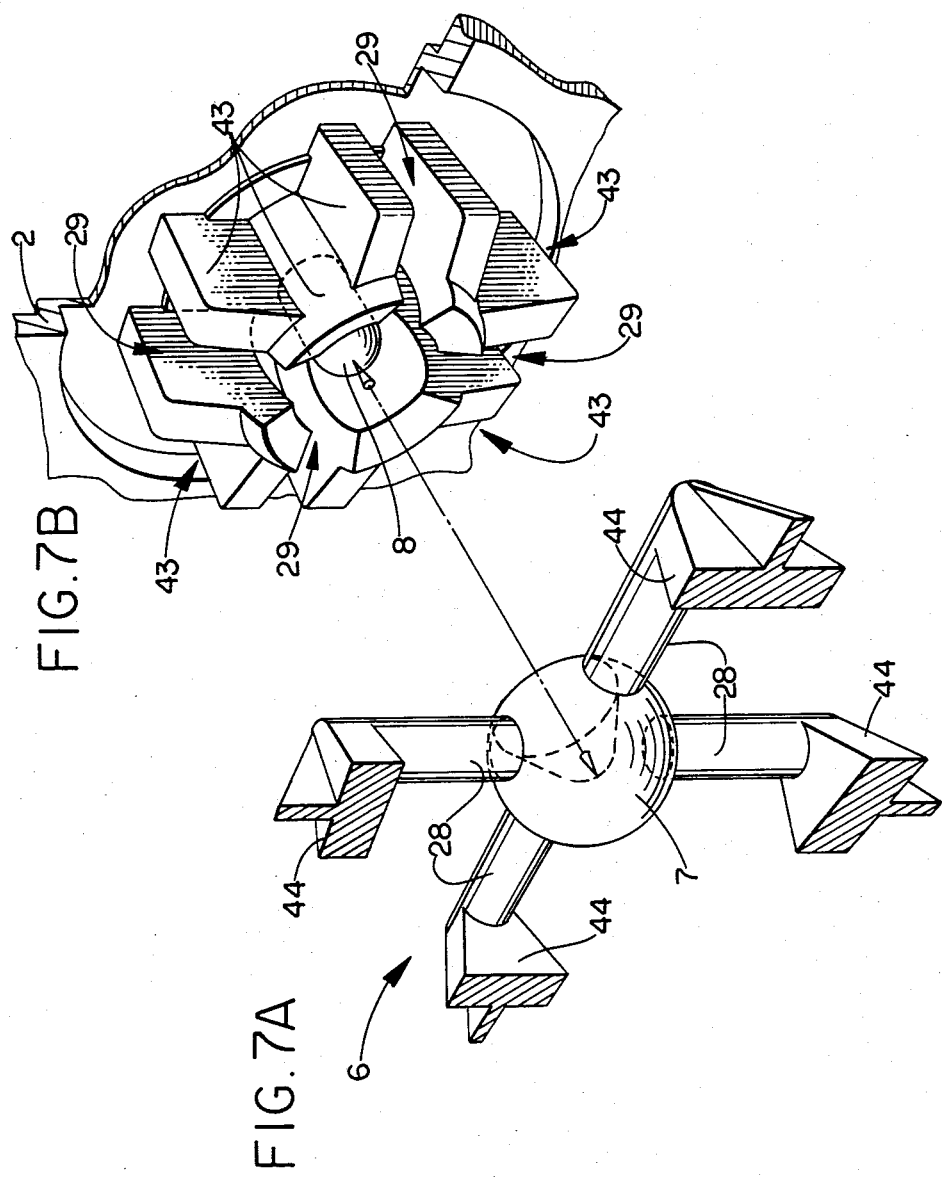

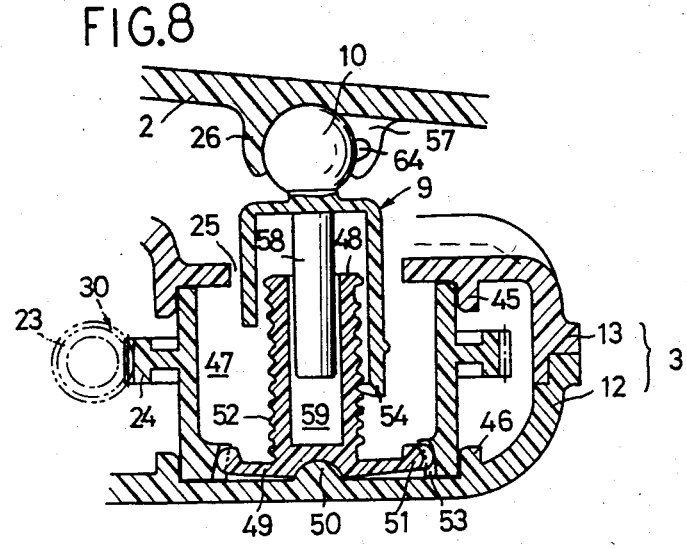
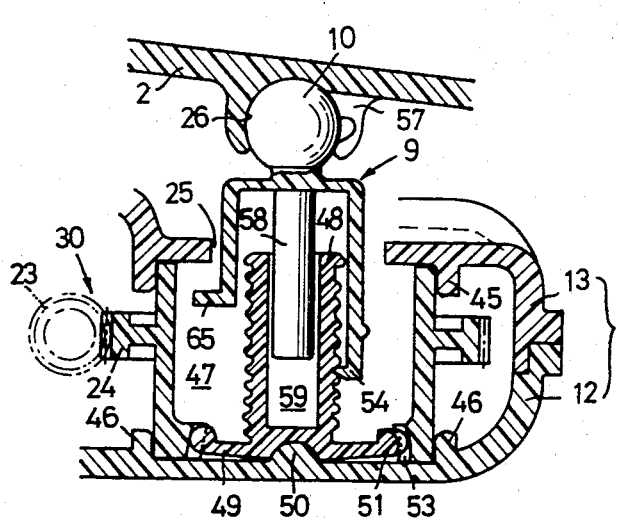
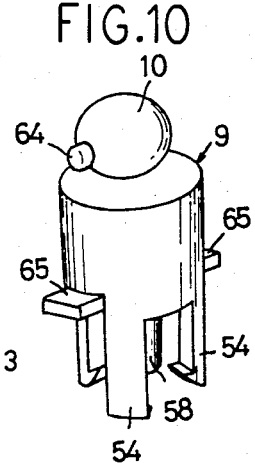

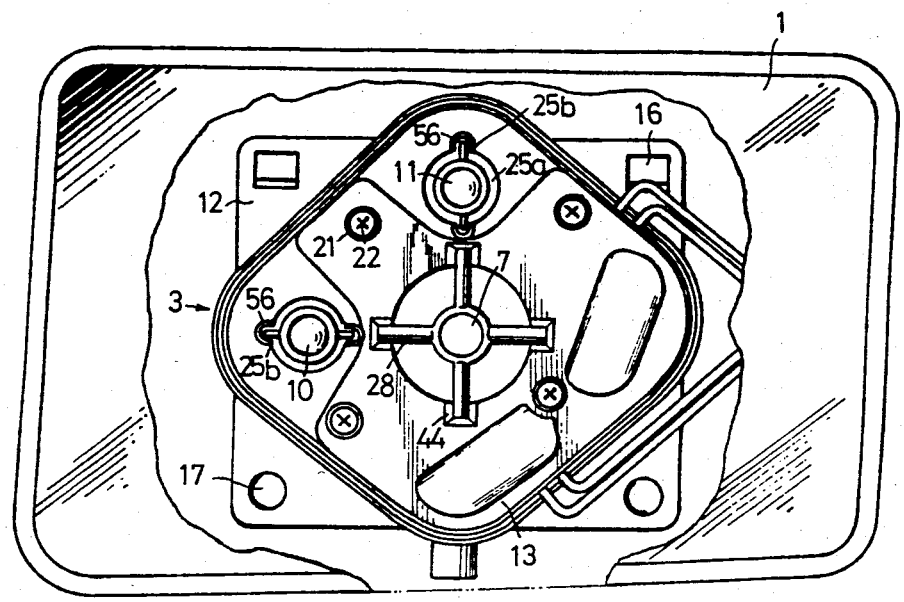
FIG.12
FIG.13
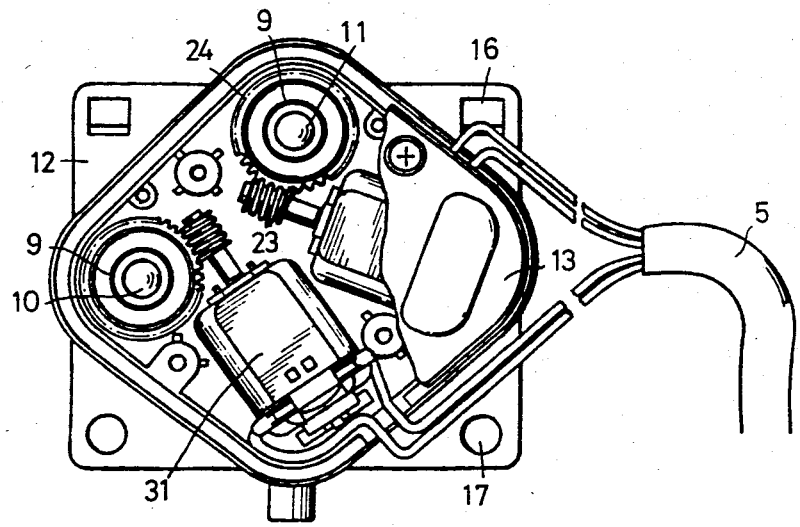

ELECTRIC MIRROR ANGLE ADJUSTING DEVICE WITH PIVOTING CROSS-SHAPED MEMBER

BACKGROUND OF THE INVENTION

1. Field of the Invention

This invention relates to an electric mirror angle adjusting device for a mirror mounted on a door, a fender or the like, of a motor vehicle. Particularly, the invention relates to an electric mirror angle adjusting device adapted to adjust the angle of reflection of the mirror by means of two actuators, characterized by having means for properly controlling the direction of inclination, horizontal or vertical, of the mirror so as to prevent the mirror from being obliquely displaced during the operation of the motor vehicle. Also, the invention facilitates the assembly of a rear-view mirror having three pivots.

2. Description of the Prior Art

Devices adapted to remotely control the angle of reflection of a rear-view mirror by means of two actuators are disclosed, for instance, in U.S. Pat. Nos. 3,609,014 and 3,972,597. Each of these devices comprises a supporting pivot for the mirror disposed in the center of an actuator unit housing, and two movable pivots therefor disposed away from said supporting pivot respectively on a horizontal axis and a vertical axis, meeting at right angles with each other, said movable pivots being movable back and forth by their actuators so as to adjust the horizontal angle and vertical angle of the mirror. Although the center of a spherical bearing for each of said movable pivots actually moves along a circular arc with its center at the supporting pivot, each of said movable pivots is adapted to move along a straight line because it is fixed to the output shaft of its actuator or to an externally threaded rod engaging with the central hole of a worm wheel of the actuator. Therefore, the movable pivots do not follow the movements of their spherical bearings, and smooth operation is not obtained. Furthermore, at the time of assembly, the pivots may not be accurately fitted in their proper positions.

Thus, the inventor has provided, in U.S. patent application Ser. No. 077,390, now U.S. Pat. No. 4,324,454, an electric mirror angle adjusting device comprising a pair of pivot screws each being pivotally attached within the central hole of a worm wheel of an actuator, an adjusting nut with a plurality of catches engaging with each pivot screw, and a movable pivot being provided at one end of each adjusting nut, so that each movable pivot not only moves back and forth but also swings conically on the root of its pivot screw as its spherical bearing moves along a circular arc. Therefore, in this device the angular adjustment of the mirror can be made smoothly, and assembly work is facilitated.

Since each movable pivot is adapted to swing conically on the root of its pivot screw as mentioned above, this device has, at the same time, the disadvantage that the mirror is not held firmly at its adjusted angle and therefore it may be obliquely displaced, that is, from its intended viewing position, by the vibration of the motor vehicle.

BRIEF SUMMARY OF INVENTION

It is therefore an object of this invention to provide an electric mirror angle adjusting device which firmly holds the mirror at its adjusted angle so as to prevent it from being obliquely displaced by vibration or the like, without losing the advantage of the aforesaid device, that is, without losing the flexibility of the movement of the movable pivots. This object has been attained by using guide means for controlling the direction of inclination of the mirror.

It is another object of the invention to provide an electric mirror angle adjusting device in which an actuator unit housing is made relatively thin so as to be easily attached within a thin rear-view mirror, such as a door mirror, and which, if struck, folds in close to the vehicle body so as to be less liable to be struck again.

It is a further object of the invention to provide an electric mirror angle adjusting device which has a small actuator unit housing and permits large angles of inclination of the mirror.

These and other objects and advantages of the invention will appear more fully from the following description.

DESCRIPTION OF THE DRAWINGS

FIGS. 1 to 8 show Embodiment No. 1 of the invention.

FIG. 1 is a partially cutaway front view of an electric mirror angle adjusting device according to Embodiment No. 1.

FIG. 2 is a transverse sectional view of the same.

FIG. 3 is a vertical sectional view of the same.

FIG. 4 is a front view of an actuator unit housing, the cover portion of which is partially cut away.

FIG. 5 is an enlarged sectional view taken on line V—V of FIG. 4

FIG. 6 is an enlarged sectional view taken on line VI—VI of FIG. 4.

FIG. 7 is a rear view of a mirror holder.

FIGS. 7(A) and 7(B) provide an exploded, enlarged view, in perspective, of the guide means shown in FIG. 7 and in FIGS. 5 and 6.

FIG. 8 is an enlarged sectional view showing a portion of an actuator unit.

FIG. 9 is an enlarged sectional view showing a portion of an actuator unit including amodified adjusting nut.

FIG. 10 is a perspective view showing said modified adjusting nut.

FIGS. 11 to 16 show Embodiment No. 2.

FIG. 11 is a partially cutaway side view showing Embodiment No. 2.

FIG. 12 is a front view of a mirror, the central portion of which is cut away to show an actuator unit housing.

FIG. 13 is a partially cutaway front view of said actuator unit housing.

FIG. 14 is a perspective view of the same.

FIG. 15 is an enlarged sectional view showing a portion of an actuator unit.

FIG. 16 is a perspective view of an adjusting nut having fins.

FIG. 17 is a perspective view showing an actuator unit and a mirror holder separated from each other symmetrically.

FIG. 18 is a front view showing fhe joints of a cross pin.

FIG. 19 is a side view showing the same.

FIG. 20 is a front view showing how the end of said cross pin is inserted into a bearing.

DETAILED DESCRIPTION

Figure 4:
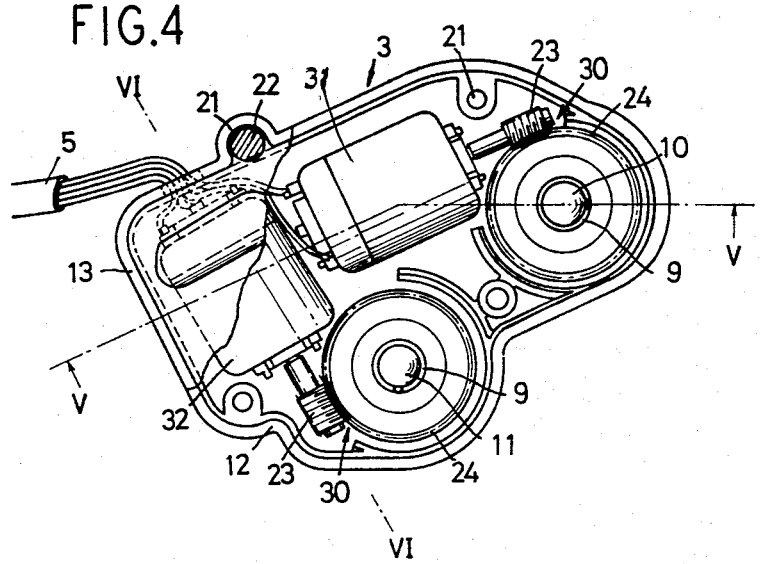

The present invention will now be described in detail, with reference to Embodiments No. 1 to No. 4 illustrated in the drawings.

Embodiment No. 1 includes both a first guide means comprising a cross-shaped member provided in fron of an actuator unit housing and a cross-shaped groove, engaging therewith, provided on a mirror holder, and a second guide means comprising openings, longer in the horizontal or vertical direction, into which adjusting nuts with movable pivots are respectively inserted. Embodiment No. 2 includes only the first guide means comprising the cross-shaped member and the cross-shaped groove, and does not include the second guide means. Embodiment 3 is similar to Embodiment No. 2, but uses a cross pin in place of the cross-shaped member. Embodiment No. 4 includes only the second guide means comprising the long openings, and does not include the first guide means.

EMBODIMENT NO. 1

FIGS. 1, 2 and 3 are a front view, a sectional plan view and a sectional side view, respectively illustrating Embodiment No. 1. Numeral 1 represents a mirror. Numeral 2 represents a mirror holder for holding the mirror 1. Numeral 3 represents an actuator unit housing containing two actuators and consisting of a base portion 12 and a cover portion 13. Numeral 4 represents a flexible sealing cover of a bellows type disposed between the mirror holder 2 and the sides of the actuator unit housing 3. Numeral 5 (see FIGS. 3 and 4) represents a harness extending outward from the actuator unit housing 3. Numeral 6 represents a first guide means for controlling the direction of inclination of the mirror 1, said first guide means 6 comprising, as described below, a cross-shaped member in front of the actuator unit housing 3 and a cross-shaped groove on the mirror holder 2. Numeral 7 represents a spherical bearing provided in the center of the cross-shaped member in front of the actuator unit housing 3. Numeral 8 represents a stationary supporting pivot provided in the center of the cross-shaped groove on the mirror holder 2. Numeral 9 (see FIGS. 4 and 5) represents each of two adjusting nuts disposed some distance away from the supporting pivot 8 respectively on a horizontal axis and a vertical axis meeting at right angles with each other at the supporting pivot 8. Numeral 10 represents a movable pivot provided on the end of one adjusting nut 9 on said horizontal axis. Numeral 11 represents another movable pivot provided on the end of the other adjusting nut 9 on said vertical axis. Numeral 14 represents a mirror body containing the actuator unit housing 3 and the mirror 1. The mirror 1 is supported on the three pivots, that is, the stationary supporting pivot 8 in the center and the two movable pivots 10, 11. Each of the adjusting nuts 9,9 with the movable pivots 10, 11 is moved back and forth by each of the actuators so as to adjust the horizontal or vertical angle of the mirror 1.

The actuator unit housing 3, consisting of the base portion 12 and the cover portion 13, is relatively thin and is secured within the mirror body 14 with its base portion 12 held by means of a fastening member 15 (see FIG. 3). A groove 20 (see FIG. 6) is provided along the edges of the cover portion 13, and a groove 20a of the same shape is provided on the back side of the mirror holder 2, said flexible sealing cover 4 being secured by means of these grooves. Numeral 21 (see FIG. 4) represents an internally threaded hole, numeral 22 a screw for fixing the base portion 12 and the cover portion 13 to each other, numeral 23 (see FIG. 4) a worm fixed to the output shaft of an electric motor, numeral 24 a worm wheel in meshing contact with the worm 23, numeral 25 (see FIGS. 1 and 5) an opening into which the adjusting nut 9 is inserted, numeral 26 a spherical bearing into which the movable pivot 10 is fitted, and numeral 27 (see FIGS. 2 and 7) a spherical bearing into which the movable pivot 11 is inserted.

GUIDE MEANS

Reference will now be made to the guide means for controlling the direction of inclination of the mirror 1. Embodiment No. 1 uses both the first guide means 6 comprising the cross-shaped member and the cross-shaped groove, and the second guide means comprising openings 25, longer in the horizontal or vertical direction, into which the adjusting nuts 9, 9 are respectively inserted. The elongated shape of the openings 25 will be seen in FIG. 1.

Figure 5:
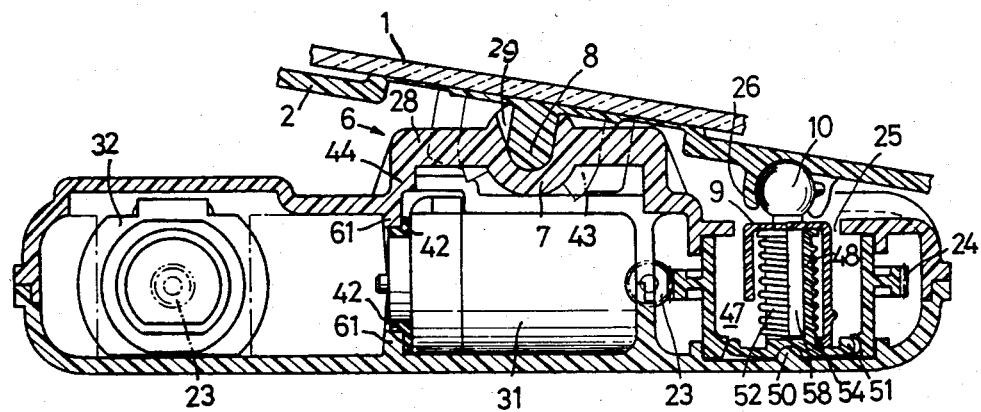
Figure 6:
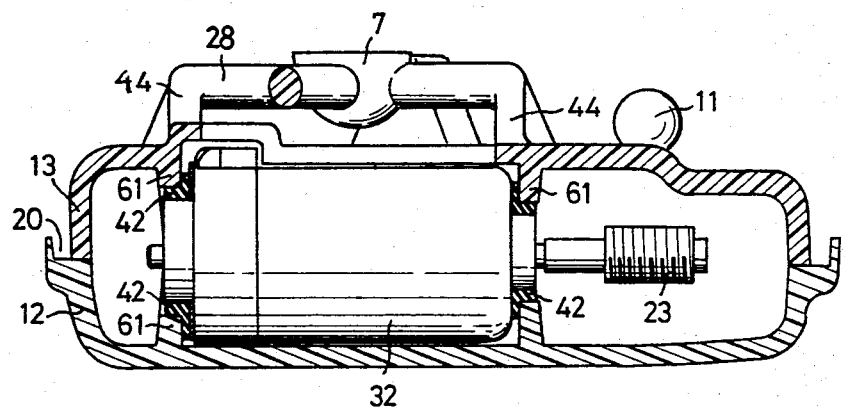
Figure 7:
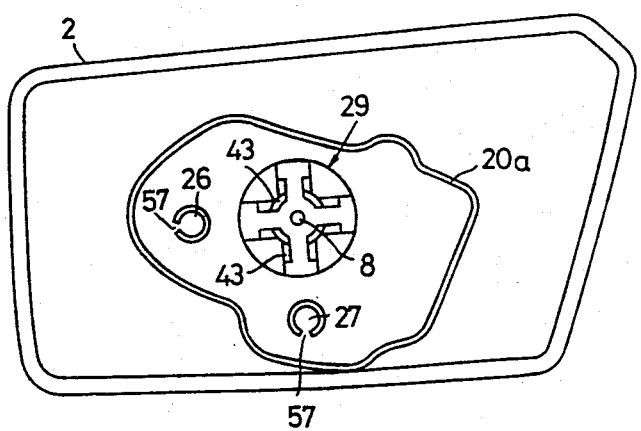
Figure 11:
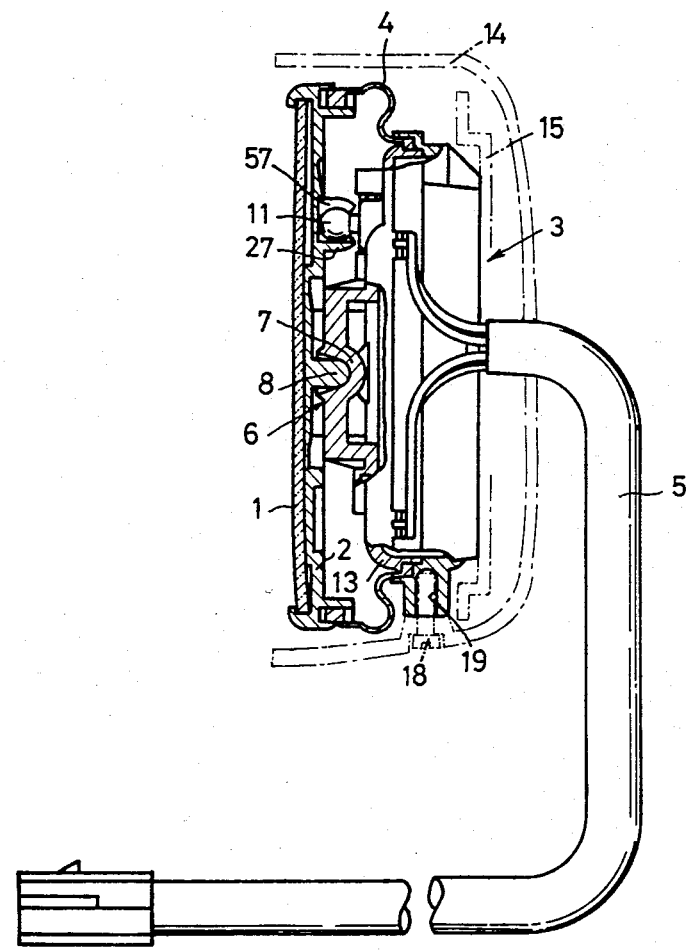
Figure 14:
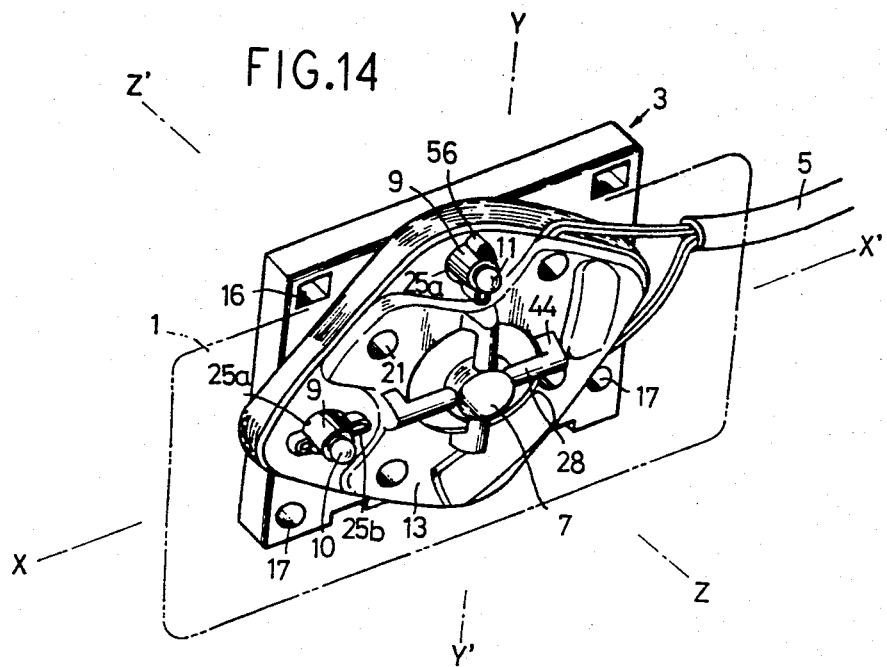

The guide means 6 comprises the cross-shaped member 28 provided in front of the cover portion 13 of the actuator unit housing 3 as shown in FIGS. 1 and 6, and the cross-shaped groove 29 provided on the back side of the mirror holder 2 as shown in FIG. 7, said cross-shaped member 28 being pivotably engaged with said cross-shaped groove 29 as shown in FIG. 5. In the exploded view, FIGS. 7(A) and 7(B), the cross-shaped member 28 and cross-shaped groove 29 are shown separated from each other for a clearer view of the structure of these elements. The cross-shaped member 28 is provided at its each end with a leg 44 as shown in FIGS. 5 and 6 and also in FIG. 7(A). The legs 44 keep the cross-shaped member 28 and the spherical bearing 7 in its center away from the front face of the actuator unit housing 3, thus the mirror 1 being kept away therefrom. The cross-shaped groove 29 comprises four members 43 each having a shape that in general resembles the letter "L" (herein referred to as "L-shaped member"), the L-shaped members 43 being disposed at spaced intervals around the central supporting pivot 8 of the mirror holder 2 so as to be opposite one another; see FIGS. 7(A) and 7(B). The four inside corners of these L-shaped members 43 support the outer surface of the spherical bearing 7 of the actuator unit housing 3. That is, as shown in FIG. 5, the inner surface of the spherical bearing 7 supports the stationary supporting pivot 8 of the mirror holder 2, and at the same time the outer surface thereof is supported by said inside corners of the L-shaped members 43. Since the mirror 1 is supported on the three pivots, that is, the stationary supporting pivot 8 and the two movable pivots 10 and 11, and since the cross-shaped member 28 is pivotably engaged with the cross-shaped groove 29, the direction of inclination, both horizontal and vertical, of the mirror 1 is properly controlled so as to ensure the accurate angular adjustment of the mirror 1. Furthermore, even when the mirror 1 is subjected to vibration during the operation of the motor vehicle the adjusted horizontal or vertical angle of the mirror 1 is maintained in the intended position and the mirror 1 is prevented from turning on the supporting pivot 8, that is, from being obliquely displaced.

The second guide means comprises two long openings 25 into which the adjusting nuts 9 are respectively inserted. As shown in FIGS. 1 and 2, the two openings 25 are made through the cover portion 13 of the actuator unit housing 3, in positions some distance away from the spherical bearing 7 respectively on said horizontal and vertical axes meeting at right angles with each other, the opening 25 on said horizontal axis being longer in the horizontal direction, the other opening 25 on said vertical axis being longer in the vertical direction. The adjusting nuts 9 respectively inserted into these long openings 25 are guided thereby as follows: When the adjusting nut 9 with the movable pivot 10 inserted into its opening 25 is moved forward or backward by its actuator, it is guided so as to tilt in the horizontal direction according to the angle of inclination of the mirror 1. When the adjusting nut 9 with the movable pivot 11 inserted into its opening 25, is moved forward or backward by its actuator, it is guided so as to tilt in the vertical direction according to the angle of inclination of the mirror 1. The adjusting nuts 9 can not move or tilt in the direction at right angles to said respective directions.

When both the first guide means and the second guide means are used, the direction of inclination of the mirror 1 is controlled most suitably.

ACTUATOR UNIT

Reference will now be made to an actuator unit for actuating the movable pivots 10 and 11. The actuator unit comprises two small electric motors 31, 32 laid within the actuator unit housing 3, two worms 23 each fixed to the output shaft of electric motor 31 or 32, two pivot screws 48 each disposed within the central hole of the worm wheel 24 in each of two worm mechanisms 30 so as to engage herewith, and the two adjusting nuts 9 each provided at its upper end with the movable pivot 10 or 11 and at its lower end with catches 54 in engagement with the threaded portion 52 of each pivot screw 48. The actuator unit housing 3 consists of the hollow base portion 12 and the hollow cover portion 13, and has a shape which in general resembles a hollow drum. Therefore, if the electric motors 31, 32 are mounted directly in the actuator unit housing 3, the vibrations of the electric motors 31, 32 and the worm mechanisms 30 are enlarged by the actuator unit housing 3, and give rise to unpleasant resonances. Thus, according to the present invention, each of the electric motors 31, 32 is provided at its each end with a vibration absorbing member 42 of an annular shape which is in contact with projecting portions 61 on the inside of the actuator unit housing 3, said vibration absorbing members 42 absorbing the vibrations of the electric motors 31,32 caused by their rotation in order to prevent said resonances (See FIG. 6.).

FIG. 8 shows in detail an assembled state of the pivot screw 48 and the adjusting nut 9 within one of the worm wheels 24. It is to be noted that FIG. 8 is an enlarged sectional view showing a state in which the adjusting nut 9 for the horizontal adjustment in FIG. 5 is moved forward. The worm wheel 24 is rotatably supported inside annular projections 45 and 46 provided on the opposing inner surfaces of the cover portion 13 and the base portion 12 of the actuator unit housing 3. The cylindrical hub of the worm wheel 24 forms a central hole 47, within which the pivot screw 48 is pivotally disposed so as to engage therewith. A semi-spherical projection 50 serving as a pivot is provided at the center of the annular projection 46 on the inner surface of the base portion 12, and a recess of a shape corresponding to the semi-spherical projection 50 is formed centrally on the lower surface of a root portion 49 of the pivot screw 48, said semi-spherical projection 50 being fitted in said recess. A convex surface 51 is formed on the circumference of the root portion 49 of the pivot screw 48, and a concave surface 53 engaging with the convex surface 51 is formed along the lower inside of the worm wheel 24, said convex surface 51 and concave surface 53 each being provided with projections and recesses so that the pivot screw 48 is connected with the worm wheel 24 and rotated thereby without slippage. Since the pivot screw 48 is mounted on the semi-spherical projection 50 serving as a pivot, the pivot screw 48 and the adjusting nut 9 tilt as the spherical bearing 26 (27) moves along a circular arc at the time of the angular adjustment of the mirror 1.

Each adjusting nut 9 is provided in its lower portion with a plurality of (three in this embodiment, but only one is shown in FIG. 8) catches 54 engaging with the threaded portion 52 of the pivot screw 48. The movable pivot 10 or 11 on top of each adjusting nut 9 is provided with a small projection 64 which is inserted into a slit 57 in the spherical bearing 26 or 27 of the mirror holder 2 so as to prevent rotation (See FIG. 8). Therefore, when one of the pivot screws 48 is rotated in either direction through the worm mechanism 30 by the electric motor 31 or 32, one of the adjusting nuts 9 moves forward or backward and thereby the angle of inclination of the mirror 1 is changed within certain limits.

Each adjusting nut 9 is provided in its center with a pin 58 which is inserted into the central hole 59 of the pivot screw 48. In assembling the rear-view mirror, each adjusting nut 9 is attached as follows: First, the worm wheel 24 and the pivot screw 48 are set in the base portion 12, and the cover portion 13 is fixed onto the base portion 12 by means of the screws 22. Then, the adjusting nut 9 is inserted into the opening 25 of the cover portion 13, and its catches 54 are engaged with the threaded portion 52 of the pivot screw 48. Before the adjusting nut 9 is attached, however, the pivot screw 48 does not necessarily stand erect on the base portion 12 because it rests only on the semi-spherical projection 50. Furthermore, even if the pivot screw 48 stands erect at that time, it is easily tilted even by a slight contact with the catches 54 of the adjusting nut 9. Therefore, it is difficult to engage the catches 54 properly with the threaded portion 52 of the pivot screw 48. According to this embodiment, however, the pin 58 provided in the center of the adjusting nut 9 facilitates the aforesaid assembly work, because the end of the pin 58 is inserted into the central hole 59 of the pivot screw 48 and automatically aligns the pivot screw 48 with the adjusting nut 9 before the catches 54 come into contact with the threaded portion 52 of the pivot screw 48.

Figure 23:
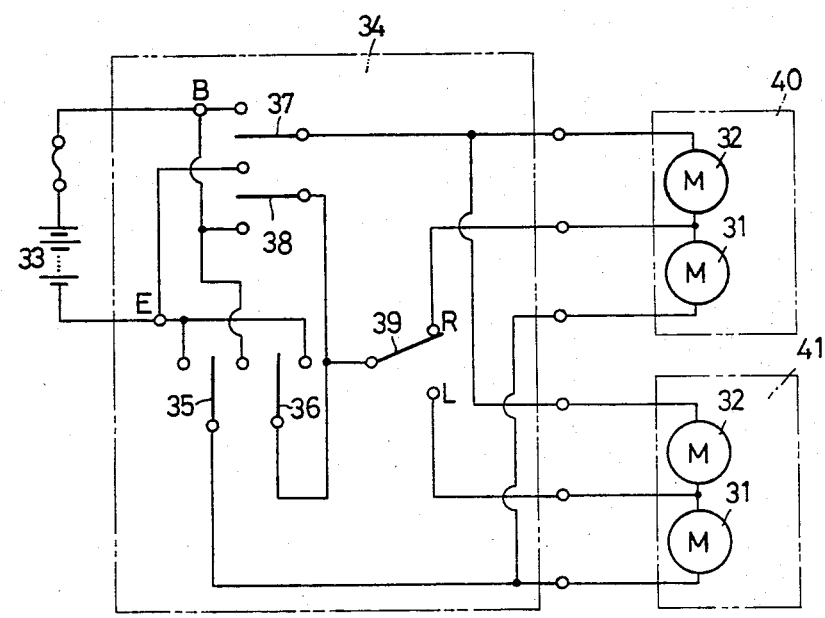
FIG. 23 is a diagram showing an example of a driving circuit for electric motors.

FIG. 23 shows an example of a driving circuit for the electric motors 31 and 32. In this figure, numeral 33 represents a battery as a power source, numeral 34 a mirror switch provided on the instrument panel, etc. of the motor vehicle, numerals 35 and 36 a changeover switch for horizontal adjustment, numerals 37 and 38 a changeover switch for vertical adjustment, numeral 39 a changeover switch between a right-hand mirror and a left-hand mirror, numeral 40 the right-hand mirror, and numeral 41 the left-hand mirror. Each of these switches 35 and 38 comprises a movable contact provided on a knob (not shown) and a fixed contact disposed on a printed circuit (not shown). The changeover switch 39 may be contained in the knob so as to move back and forth, or it may be an independent changeover switch disposed beside the knob. By means of these changeover switches, it is possible to switch to either the right-hand mirror 40 of the left-hand mirror 41 and then adjust its angle horizontally and/or vertically, as desired, by rotating the electric motor or motors in either direction.

As shown in FIGS. 1 to 3, the mirror body 14 of this embodiment is made thin so that if struck from the front by an object it will fold in close to the vehicle body so as to be less liable to be struck immediately after by another object. The actuator unit housing 3 is fixed by means of screws to the fastening member 15 within the mirror body 14. The fastening member 15 is provided on its upper portion with a retaining portion 71 having a flange, to which one end of a coiled spring 70 is fastened, the other end thereof being fastened through the intermediary of a link 76 to a bracked 77 on a stay 72. The mirror body 14 is connected to the stay 72 by a double-action link 73 having two hinges 74 and 75.

OPERATION

The operation of the electric mirror angle adjusting device of the invention will now be described.

To use the device, it is necessary, first of all, to choose whether the right-hand mirror 40 or the left-hand mirror 41 is to be angularly adjusted, and manipulate the changeover switch 39 accordingly. If, for example, the changeover switch 39 is switched to the right side (R side) as shown in FIG. 23 and the changeover switches 37,38 for vertical adjustment are pushed upward, the electric motor 32 for the right-hand mirror 40 is energized and starts rotating in the normal direction. Then, the electric motor 32 rotates its worm 23 and the worm wheel 24 shown in FIG. 4, and the worm wheel 24 rotates the pivot screw 48 engaged therewith. By the rotation of the pivot screw 48, the adjusting nut 9 with the movable pivot 11 for vertical adjustment is moved forward because its catches 54 are engaged with the threaded portion 52 of the pivot screw 48. By the forward movement of the movable pivot 11, the right-hand mirror 40 is turned on its supporting pivot 8 and thus its vertical angle is adjusted. When the desired angle of the right-hand mirror 40 is obtained, the changeover switches 37, 38 are returned to their neutral positions. If the changeover switches 37, 38 are pushed downward, the electric motor 32 rotates in the reversed direction and moves the adjusting nut 9 backward so as to adjust the right-hand mirror 40 in the opposite direction. To make the horizontal adjustment of the right-hand mirror 40, the changeover switches 37, 38 are kept in neutral and the changeover switches 35, 36 are pushed to the right or left side in FIG. 23 to rotate the electric motor 31 in the normal or reversed direction. Then, the adjusting nut 9 with the movable pivot 10 for horizontal adjustment is moved forward or backward in the same way as mentioned above so as to make the horizontal adjustment of the right-hand mirror 40. To make the horizontal or vertical adjustment of the left-hand mirror 41, the changeover switch 39 is switched to the left side (L side) in FIG. 23 and then the same procedures as above are taken.

Apart from the automatic adjustment described above, it is also possible to manually adjust the angle of each mirror. If the front face of the mirror is pushed with fingers at a position away from the supporting pivot 8, and catches 54 of the adjusting nut 9 are widened by the force of fingers and move forward or backward along the threaded portion 52 of the pivot screw 48. Thus, the adjusting nut 9 moves forward or backward and turns the mirror on its supporting pivot 8.

MODIFIED EXAMPLE OF ADJUSTING NUT

FIG. 10 shows a modified example of the adjusting nut 9. In this example, the adjusting nut 9 is provided beside the roots of its catches 54 with a plurality of (two in FIG. 10) projections 65 which extend outward beyond the perimeter of the opening 25 so as to prevent the adjusting nut 9 from coming out of the opening 25. When the mirror 1 is detached from the actuator unit housing 3 for the readjustment of the mirror setting, the adjusting nut 9 without such projections 65 is liable to be pulled away from its pivot screw 48, and therefore it has to be reengaged with the pivot screw 48. In this modified example, however, even when the mirror 1 is detached from the actuator unit housing 3, the adjusting nut 9 is not disengaged from its pivot screw 48 because its catches 65 contact the inner surface of the opening 25 (See FIG. 9). This feature faciltates the assembly and readjustment of the rear-view mirror.

EMBODIMENT NO. 2

Reference will now be made to Embodiment No. 2 in which the actuator unit housing 3 has a modified shape. As shown in FIGS. 11 to 14, the actuator unit housing 3 is made thin and has a shape of a lozenge, the diagonals of which coincide with the aforesaid horizontal and vertical axes, the vertexes of said lozenge being rounded off.

The actuator unit housing 3 is fixed by means of holes 16 engaging with the fastening member 15 fixed within the mirror body 14, screw holes 17, and an internally threaded hole 19 into which a setscrew 18 is inserted from below. The base portion 12 and the cover portion 13 of the actuator unit housing 3 are fixed to each other by means of the screws 22 inserted into the internally threaded holes 21 in the same manner as in Embodiment No. 1. Embodiment No. 2 is the same as Embodiment No. 1 also in the guide means 6 comprising the cross-shaped member 28 in front of the actuator unit housing 3 and the cross shaped groove 29 on the mirror body 14.

Figure 15:
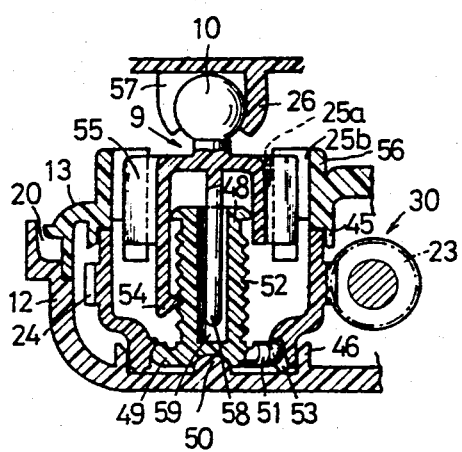
Figure 16:
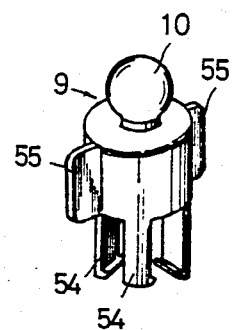

Each adjusting nut 9 of Embodiment No. 2, unlike that of Embodiment No. 1, is provided on its sides with a pair of fins 55 as shown in FIGS. 15 and 16. Each opening 25 into which each adjusting nut 9 is inserted comprises a round hole 25a and a pair of U-shaped notches 25b provided along the diameter of the round hole 25a. The opening 25 on the aforesaid horizontal axis has its U-shaped notches 25b along the horizontal axis, and the opening 25 on the aforesaid vertical axis has its U-shaped notches 25b along the vertical axis. Each of the U-shaped notches 25b is provided on its top with a fin guide 56 having a U-shaped section for guiding each fin 55 of the adjusting nut 9. Since the main body of each adjusting nut 9 is inserted into the round hole 25a and its fins 55 are loosely guided within the fin guides 56, each adjusting nut 9 smoothly tilts as the spherical bearing 26 or 27 moves along a circular arc during operation. Also, since the fins 55 and the fin guides 56 prevent the rotation of the adjusting nuts 9, it is not necessary to provide the small projection 64 on the movable pivots 10, 11.

In Embodiment No. 2, the operation of adjusting the angle of the mirror 1 is the same as in Embodiment No.

1, that is, it is adjusted by moving the movable pivots 10, 11 forward or backward by means of their actuators. Therefore, the operation will not be described further. Since in Embodiment No. 2 the actuator unit housing 3 has a shape of a lozenge whose vertexes are rounded off, the horizontal and vertical adjustments of the mirror 1 can be performed in a wider range than in Embodiment No. 1. Particularly because the four sides of the lozenge are inclined at an angle of approximately 45 degrees, the actuator unit housing 3 allows the mirror 1 to incline sufficiently in any direction that is a combination of a horizontal direction X—X' or a vertical direction Y—Y' and a direction Z—Z' in FIG. 14. As a result, the mirror 1 is allowed to incline three-dimensionally in a much wider range.

EMBODIMENT NO. 3

Figure 17:
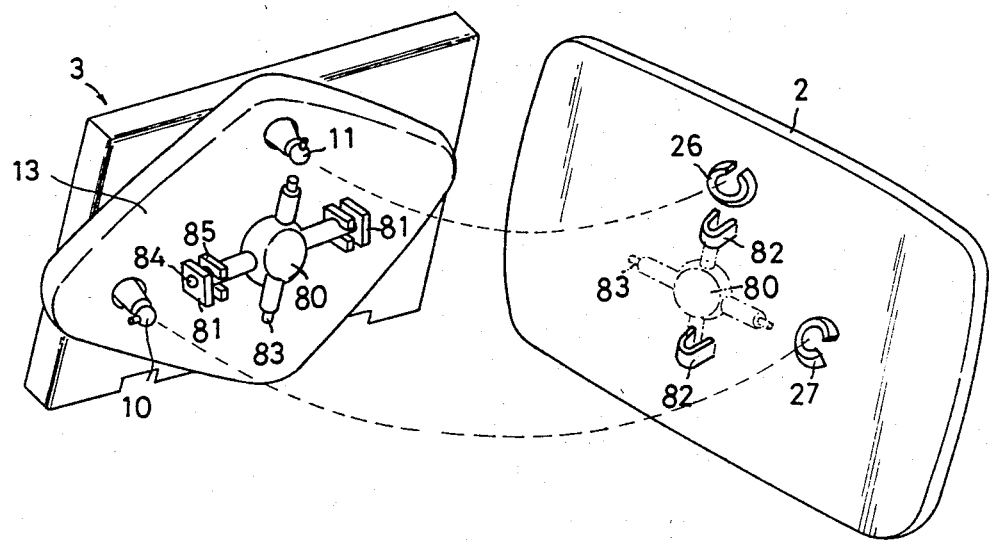
FIGS. 17 to 20 show Embodiment No. 3.
Figures 18, 19:
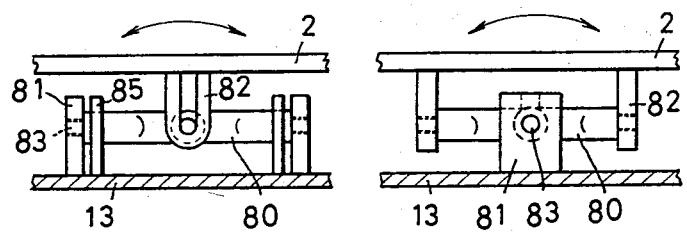

FIGS. 17 to 20 show Embodiment No. 3, in which the aforesaid cross-shaped member 28 in Embodiment No. 2 is replaced by a cross pin 80 so as to form a universal joint. As shown in FIG. 17, one of the two axes (for instance, horizontal axis) of the cross pin 80 is supported by a pair of bearings 81 disposed in corresponding positions on the cover portion 13 of the actuator unit housing 3, and the other axis (for instance, vertical axis) thereof is supported by a pair of bearings 82 disposed in corresponding positions on the mirror holder 2. Each end 83 of the cross pin 80 has a smaller diameter than other portions thereof so as to be inserted into each bearing 81 or 82. Each of the bearings 81 has a hole 84 into which the end 83 of the cross pin 81 is inserted, while each of the bearings 82 has a shape of the letter"U", the inside width of which corresponds to the outside diameter of the end 83. On the inside of and close to each of the bearings 81, there is a guide 85 having a U-shaped opening which is open toward the front. The movable pivots 10 and 11 are the same as those in Embodiment No. 1 or 2.

Conventional bearings used for such a purpose comprise a circular hole having a notch, and an axis is forced into the circular hole through the notch. However, if the mirror body or the mirror receives an impact load, etc., the axis may get out of the bearing through its notch and therefore the mirror holder may be disengaged from the actuator unit housing.

Figure 20:
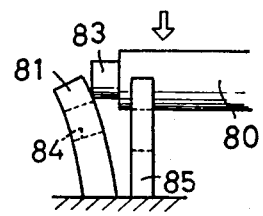

Thus, in Embodiment No. 3, the bearings on the actuator unit housing 3 and the bearings on the mirror holder 2, disposed on respective lines meeting at right angles with each other, have the aforesaid constructions, and the cross pin 80 is forcefully pushed into the bearings 81 along the guides 85 by utilizing the flexibility of the bearings 81 as shown in FIG. 20.

According to Embodiment No. 3, even if the mirror body 14 or the mirror 1 receives an impact load, etc., the mirror holder 2 is not disengaged from the actuator unit housing 3 unless the bearings 81, 82 are damaged.

While the guides 85 are disposed only on the actuator unit housing 3 in FIG. 17, it is to be noted that they may be disposed also on the mirror holder 2.

EMBODIMENT NO. 4

Figure 21:
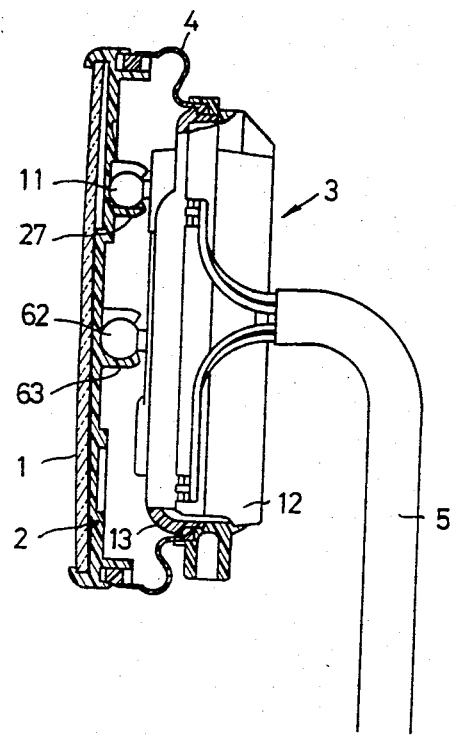
FIG. 21 is a side view of Embodiment No. 4.
Figure 22:
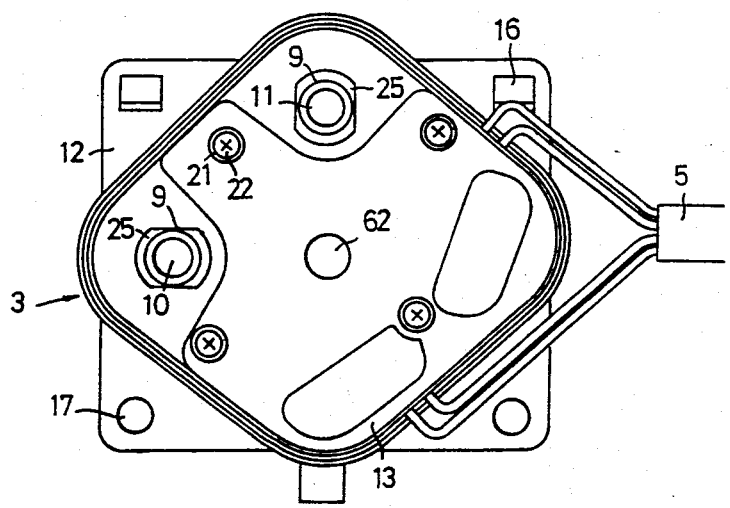
FIG. 22 is a front view showing an actuator unit housing used in Embodiment No. 4.

FIGS. 21 and 22 show Embodiment No. 4. In this embodiment, the aforesaid first guide means, comprising the cross-shaped member 28 and the cross-shaped groove 29, is not used, and the direction of inclination of the mirror 1 is controlled only by the aforesaid second guide means comprising the long opening 25 into which the adjusting nuts 9 are respectively inserted. A central supporting pivot 62 protrudes from the cover portion 13 of the actuator unit housing 3, and is fitted into a central spherical bearing 63 on the mirror holder 2. The supporting pivot 62, along with the two movable pivots 10, 11, supports the mirror 1. The adjusting nut 9 with the movable pivot 10 disposed on the aforesaid horizontal axis is inserted into the opening 25 which is longer in the horizontal direction. The adjusting nut 9 with the movable pivot 11 disposed on the aforesaid vertical axis is inserted into the opening 25 which is longer in the vertical direction. When the adjusting nut 9 on the horizontal or vertical axis is moved forward or backward by its actuator, it is guided by its long opening 25 so as to tilt in the horizontal or vertical direction as the spherical bearing 26 or 27 on the mirror holder 2 moves along a circular arc. While the above-mentioned second guide means is much simpler in construction than the first guide means comprising the cross-shaped member 28 and the cross-shaped groove 29, it can properly control the direction of inclination, both horizontal and vertical, of the mirror 1 so as to prevent the mirror 1 from being obliquely displaced.

ADVANTAGES

According to the present invention, the actuator unit housing containing the two actuators is relatively thin so that it can be easily attached within a small and thin rear-view mirror such as a door mirror, and the horizontal and vertical angles of the mirror can be adjusted in a wide range. Also, because the guide means for controlling the direction of inclination of the mirror are provided between the mirror holder and the actuator unit housing, the inclination of the mirror is accurately maintained and the mirror is completely prevented from being obliquely displaced during the operation of the motor vehicle. Furthermore, because the actuator unit comprises the two electric motors and the two worm mechanisms respectively in direct engagement therewith, unlike prior art devices whose actuator unit comprises a single electric motor and a solenoid-type clutch, the present invention has the advantage that the angle of the mirror can be adjusted surely and quickly.

As many apparently widely different embodiments of this invention may be made without departing from the spirit and scope thereof, it is to be understood that the invention is not limited to the specific embodiments thereof except as defined in the appended claims.

What is claimed is:

1. An electric mirror angle adjusting device comprising:

a mirror having a front and a back face
   a mirror holder having a front and a back face said mirror holder being mounted on the back face of said mirror,
   a stationary supporting pivot provided on the back face of said mirror holder,
   an actuator unit including a housing pivotably connected to said mirror holder at the back face thereof, two actuators, two worm mechanisms respectively driven by said actuators, two pivot screws respectively disposed within worm wheels in said worm mechanisms, and adjusting nuts each having a movable pivot, each said adjusting nut being respectively moved forward or backward by rotation of said pivot screw engaged therewith, and
   a guide means for controlling the direction of horizontal and vertical inclination of said mirror, said mirror holder being movable under the control of said guide means about said stationary supporting pivot, said guide means comprising a cross-shaped member disposed on said actuator unit housing, having adjacent its center a spherical bearing having an inner surface into which said stationary supporting pivot is fitted, and an outer surface, said cross-shaped member extending along the horizontal and vertical axes of said mirror, and a cross-shaped groove provided on the back face of said mirror holder pivotably engaging said cross-shaped member, the said outer surface of said spherical bearing being supported by internal members of said cross-shaped groove which abut said outer surface of said spherical surface.

2. An electric mirror angle adjusting device as claimed in claim 1, which is further provided with another guide means for controlling the direction of inclination, horizontal or vertical, of said mirror, said another guide means comprising said adjusting nuts disposed within said actuator unit housing, two openings into which said adjusting nuts are respectively inserted, said openings being both provided through the front face of said actuator unit housing, one of said openings, for horizontal adjustment, being longer in the horizontal direction, the other opening for vertical adjustment being longer in the vertical direction.

3. An electric mirror angle adjusting device as claimed in claim 1 wherein said actuator unit comprises two small electric motors within said actuator unit housing, two worm wheels respectively driven by said electric motors, two pivot screws respectively disposed within said worm wheels and engaged therewith, and said adjusting nuts respectively engaging with said pivot screws.

4. An electric mirror angle adjusting device as claimed in claim 3, wherein each said electric motor is provided with a vibration absorbing member and each said electric motor is mounted within said actuator unit housing through the intermediary of said vibration absorbing members so as to prevent resonances of said actuator unit housing during rotation of said electric motors.

5. An electric mirror angle adjusting device as claimed in claim 3, wherein each of said adjusting nuts is provided at its lower end with a plurality of catches engaging with one of said pivot screws, and is further provided with projections extending outward beyond the perimeter of said opening so as to prevent the adjusting nut from coming out of the opening.

* * * * *